E. G. BAILEY.
APPARATUS FOR METERING GRANULAR MATERIAL.
APPLICATION FILED SEPT. 23, 1921.
1,425,936.
Patented Aug. 15, 1922.
2 SHEETS—SHEET 2.
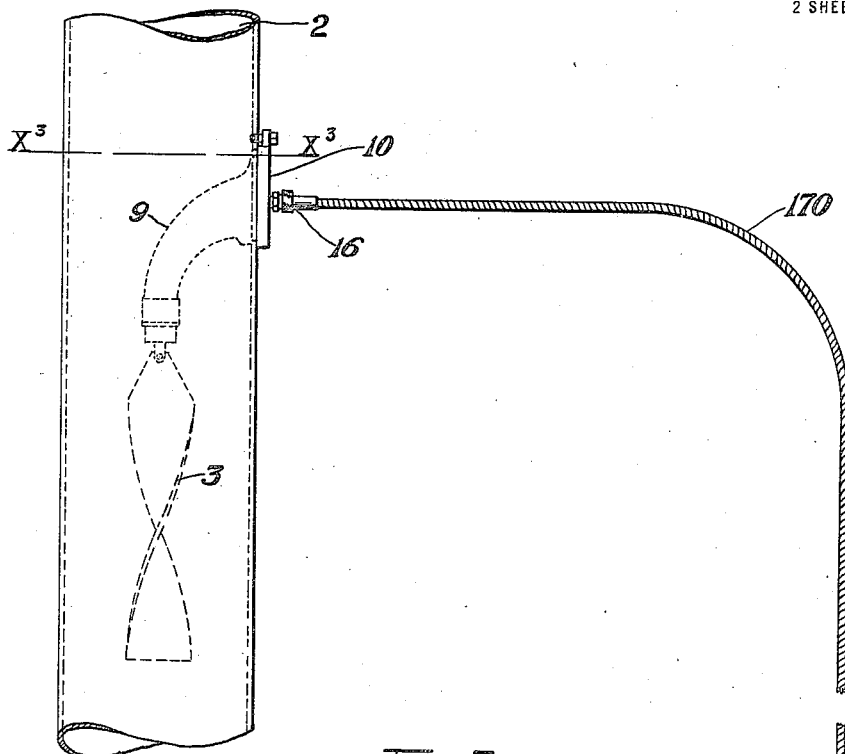
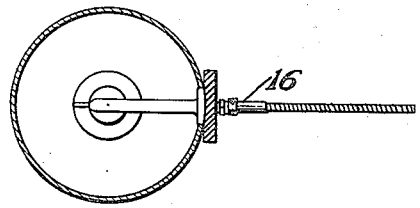
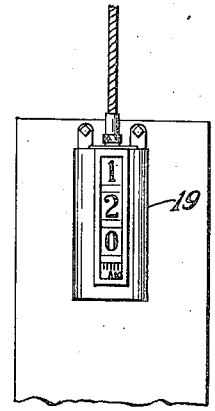
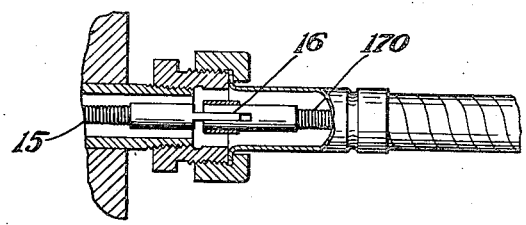
INVENTOR
BY Ervin G. Bailey
Jo. P. Livermore
ATTORNEY

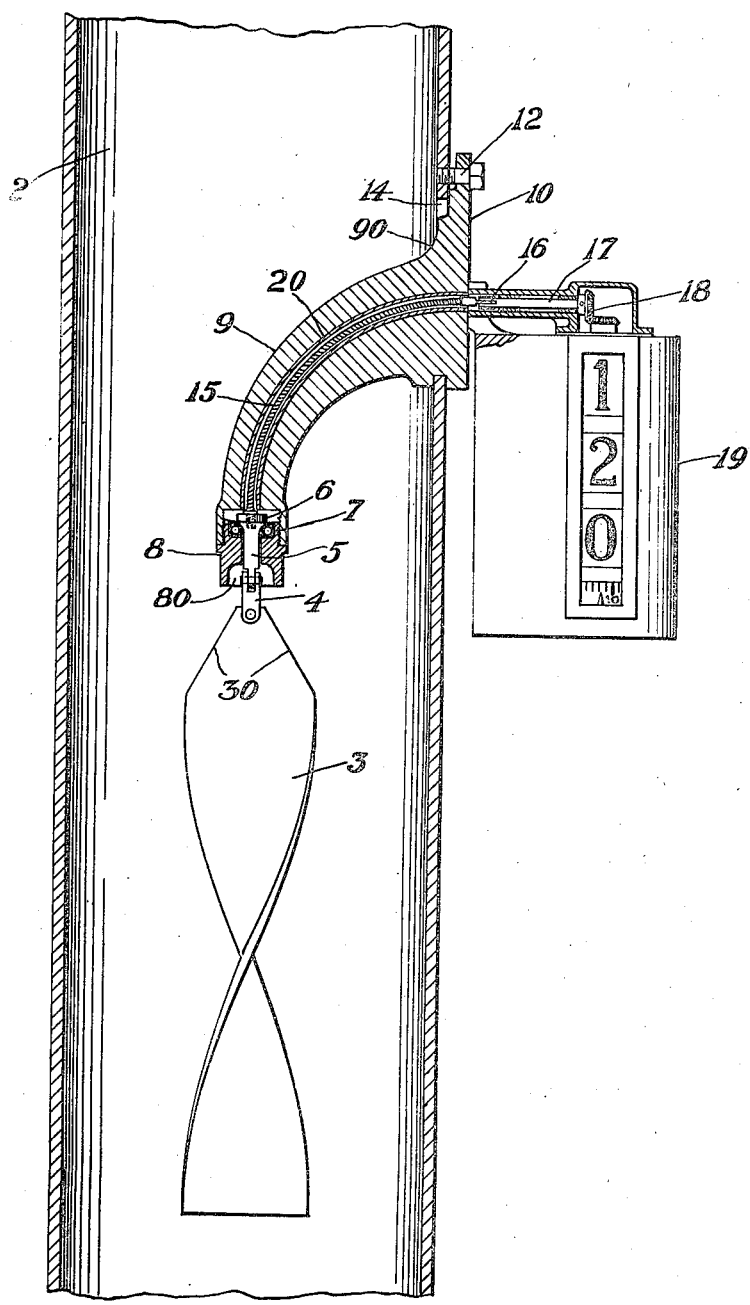

UNITED STATES PATENT OFFICE.

ERVIN G. BAILEY, OF CLEVELAND HEIGHTS, OHIO, ASSIGNOR TO BAILEY METER COMPANY, OF BOSTON, MASSACHUSETTS, A CORPORATION OF MASSACHUSETTS.

APPARATUS FOR METERING GRANULAR MATERIAL.

1,425,936.      Specification of Letters Patent.     Patented Aug. 15, 1922.

Application filed September 23, 1921. Serial No. 502,750.

*To all whom it may concern:*

Be it known that I, ERVIN G. BAILEY, a citizen of the United States, and a resident of Cleveland Heights, in the county of Cuyahoga and State of Ohio, have invented an Improvement in Apparatus for Metering Granular Material, of which the following description, in connection with the accompanying drawings, is a specification, like reference characters representing like parts.

This invention relates to an apparatus for metering granular material such as wheat or corn or certain grades of coal, and materials of like nature adapted to flow by gravitation through a conduit while maintaining the bore of the conduit substantially full, at least in some portion of its length at which the metering action takes place.

The invention is embodied in an apparatus of that kind in which a propeller or actuator having a blade or blades disposed in the conduit for the material to be measured in such manner as to be given a rotary movement about an axis coincident or parallel with that of the conduit by the flow of the material passing through the same, is connected with a counting mechanism outside of the conduit which keeps account of the movement of the actuator and thus affords a basis for measurement of the material which has flowed through the conduit in the period of accounting.

The present invention relates especially to the construction of the appliances for supporting the propeller or actuator in the conduit and for providing for the actuating connection therefrom to the counting mechanism outside, the object of the invention being to construct such supporting and connecting mechanism in such manner as not to interfere materially with the flow of material through the conduit and not afford any opportunity for extraneous material, such as strings, rags, wire and the like which may happen to be in the material to be caught and retained by the metering mechanism so as to clog the conduit or interfere with the metering operation.

The nature of the invention by which this object is attained may be best understood from the embodiment thereof shown in the accompanying drawings, in which, Fig. 1 is a longitudinal section of a metering apparatus embodying this invention;

Fig. 2 a side elevation thereof showing a modification of the external connection to the counter;

Fig. 3 a transverse section on line $X^3$—$X^3$ Fig. 2; and

Fig. 4 an enlarged sectional detail to be referred to.

The metering apparatus comprises, or is employed in connection with a conduit 2, through which the material flows while substantially filling the bore thereof, so that a knowledge of the velocity and duration of the movement or flow of the material through the conduit will afford a basis for ascertaining the volume of material which has passed during a given period of movement.

The velocity and duration of the movement is made known through the action of the material upon the propeller 3 or actuator for the counting mechanism, said propeller being shown in this instance as a spirally twisted blade pivotally supported in or parallel with the axis of the conduit 2, but restrained from longitudinal movement therein, so that the material in flowing along the blade causes the same to rotate with a speed of rotation proportional to the velocity of movement of the material through the conduit.

An accounting of the number of rotations of the propeller 3 in a given period will accordingly afford a knowledge of the extent of the movement of the material through the conduit past the propeller blade during that period.

In order to provide for the pivotal support of the propeller 3 and to transmit the motion therefrom to a counter mechanism 19 outside of the conduit so that an account of the movement of the propeller may be shown, the said propeller is in accordance with this invention connected by a universal or double swivel joint 4 with a short shaft 5 having a head or enlargement 6 adapted to be supported upon an anti-friction thrust bearing 7 the supporting member 8 of which is mounted, as by screw threads, at the lower end of a curved bracket 9 having a foot or base 10 adapted to be secured to the side wall of the conduit 2 as by a bolt 12 over an opening 14 in the side of the conduit through which the propeller 3 and bracket 9 may be passed in making the installation of the meter in the conduit.

The bracket 9 as best shown in Fig. 1 is curved from the base 10, where it extends through the sides of the conduit approximately at right angles to the length of the conduit, to the position where it supports the bearings 7, 8, for the propeller 3, where the said bracket is substantially in line with or parallel to the axis of the conduit, and in order to provide for the transmission of the rotary movement from the propeller 3 and its shaft 5 to the counting mechanism 4, a flexible shaft 15 is passed through a bore in the curved bracket 9, and as shown in Fig. 1, the said flexible shaft 15 is connected by a coupling 16 with a horizontal shaft 17 connected by bevelled gearing 18 with a vertical shaft which actuates the series of counting wheels of the counter 19 in any suitable or usual manner.

In order to provide the curved passage in the bracket for the flexible shaft, said bracket as shown in this instance is composed of an internal tubular core 20 imbedded in the remainder of the material of the bracket 9 which is preferably of cast iron, the bracket being produced by first preparing the curved tubular core, which may be of steel or wrought metal tubing, and introducing the said curved tube into a mould in which the remainder of the bracket is cast, so as to imbed the tubular core 20 within it.

It will be recognized that by having the supporting bracket for the propeller thus curved there is no re-entering angle on the side towards which the material is approaching in its flow through the conduit 2, and there is nothing upon whch extraneous material of a fibrous nature may catch or become entangled as is liable to be the case in meters of this general character as heretofore constructed, and the thrust bearing for the propeller is well protected from the action of the material passing through the conduit, so as not to be damaged if the material is of a gritty nature.

The upper surface of the bracket 9, against which the material impinges as it flows through the conduit, is reversely curved as shown at 90 and thus merged into the surface of the conduit and is inclined downward throughout its entire length, so that foreign material of the kind referred to will easily slide along the same and pass down with the material flowing through the conduit.

The bearing member 8 at the lower end of the bracket is shown as provided with a recess or cup-like formation 80 which forms a hood or screen over the swivel joint 4 by which the propeller 3 is connected with the shaft 5 and in connection with the bevelled formation of the upper end of the propeller 3 as indicated at 30 guards against the possibility of material catching and remaining upon the propeller.

In the construction shown in Figs. 2 and 3, the flexible shaft 15 in the bracket 3 is connected by a coupling 16 with an external flexible shaft 170 that may be extended to a considerable distance from the conduit 2 so that the counter 19 may if desired be located at a more convenient point than may be available directly at the side of the conduit where the counter 19, shown in Fig. 1, is located.

Fig. 4 is an enlarged detail showing the construction of the coupling 16 between the flexible shaft 15 and the external flexible shaft 170 or it may be with the short horizontal shaft 17 shown in Fig. 1.

By having the propeller extend from the supporting bracket in the direction of the flow of the material through the conduit, the natural tendency of the material is to keep the propeller in alinement with the axis of the conduit, although it may yield if anything in the material passing it tends to thrust it aside temporarily, and the universal joint connection at 4 permits such lateral yielding of the propeller without straining the shaft or causing undue pressure or binding in its bearings.

Claims:

1. An apparatus for metering the flow of granular material through a conduit, comprising a propeller adapted to be rotated about an axis substantially in or parallel with the axis of the conduit, combined with a curved supporting bracket for said propeller having a longitudinal curved passage therethrough, and having a base adapted to be secured in and to close an opening through the side of the conduit with the other end of the bracket terminating substantially in line with the axis of the conduit, a bearing for the propeller at said inner end of the bracket, and a flexible shaft connected with said propeller to be actuated thereby and extending through the passage in the bracket to actuate an external counting mechanism.

2. An apparatus for metering granular material comprising a curved bracket composed of a curved tubular core and a cast body portion in which said core is imbedded having a base adapted to be secured in the wall of a conduit, combined with a propeller and pivotal supporting shaft therefor having a bearing supported at the inner end of said bracket, and a flexible shaft connected with said supporting shaft and extending through the tubular core of the bracket, and a counting train actuated by said propeller through said flexible shaft.

3. In a meter for granular material a curved bracket having a longitudinal passage therethrough and having at one end a base adapted to be secured in and to close an opening through the side of a conduit, and provided at its other end with a thrust bearing; combined with a shaft supported in said thrust bearing and adapted to rotate on an axis in line with the conduit and a propeller connected by a universal joint with one end of said shaft, and a flexible shaft connected with the other end of said shaft and extending through the passage in the bracket, and a counting train actuated by said propeller through said flexible shaft.

4. In an apparatus for metering granular material, the combination with a conduit through which the material is adapted to flow, of a propeller in said conduit adapted to be rotated by the material flowing past it, and a curved supporting bracket having a longitudinal passage therethrough and having a base secured in the wall of the conduit, said bracket having its surface curved continuously from a portion substantially tangential to the inner surface of the conduit to a portion approximately in line with the axis of the conduit, and said propeller extending from the bracket in the direction of the flow of the material through the conduit.

ERVIN G. BAILEY.